Dec. 10, 1968     E. I. VALYI     3,415,916
METHOD AND APPARATUS FOR MAKING HOLLOW ARTICLES
OF ORGANIC PLASTIC MATERIAL
Filed April 27, 1966     2 Sheets-Sheet 1
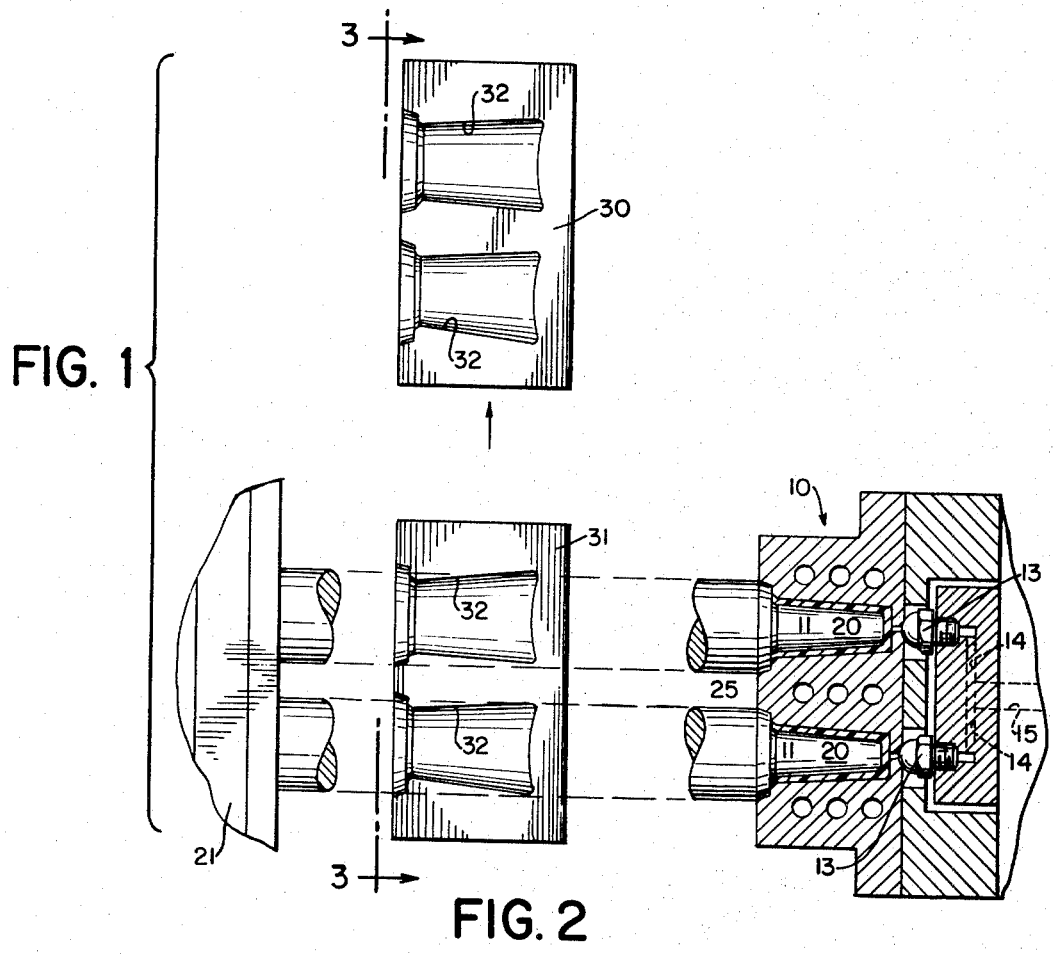
FIG. 1
FIG. 2
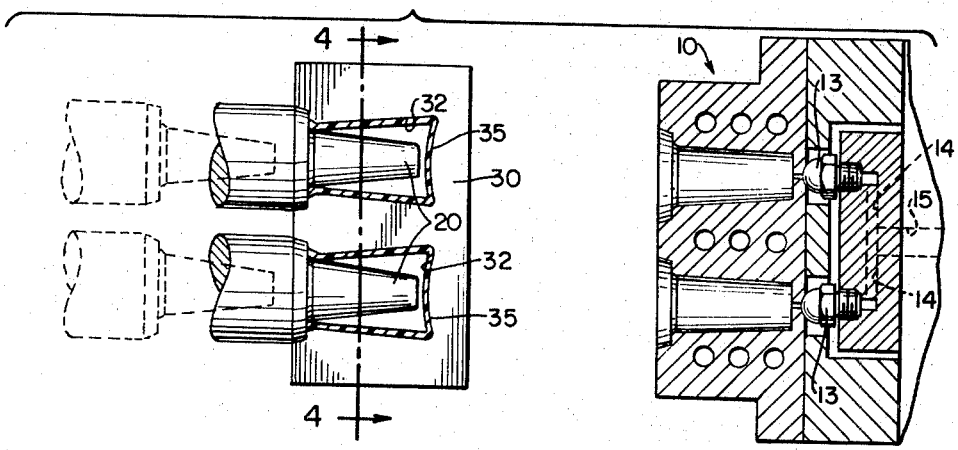
INVENTOR.
EMERY I. VALYI
BY
ATTORNEY

INVENTOR.
EMERY I. VALYI
BY
ATTORNEY

United States Patent Office 3,415,916
Patented Dec. 10, 1968

3,415,916
METHOD AND APPARATUS FOR MAKING HOLLOW ARTICLES OF ORGANIC PLASTIC MATERIAL
Emery I. Valyi, 5200 Sycamore Ave., Riverdale, Bronx, N.Y. 10471
Filed Apr. 27, 1966, Ser. No. 545,682
6 Claims. (Cl. 264—97)

ABSTRACT OF THE DISCLOSURE

Blow molding apparatus including a parison die, blow cores and a blow mold, in which the die and mold have a plurality of cavities and in which the blow cores are shiftable in a first path between the parison die and the blow mold station. The blow mold is composed of a central part and a pair of opposed outer parts in which the mold cavities are formed. The outer parts are retractable out of the path of the blow cores along a second path normal to the first path leaving blown articles in the central part, and the central part is retractable out of the path of the blow cores to a discharge station along a third path normal to the first and second paths.

---

This invention relates to a method and apparatus for making hollow articles of organic plastic material and more particularly to the simultaneous injection and the simultaneous blowing of a plurality of such hollow articles.

An object of the invention is to provide improved means for the simultaneous injection of a plurality of parisons in a multi-cavity parison die wherein the various cavities are arranged equidistant from a central injection orifice so that the plastic is supplied to all of the cavities under the same temperature and pressure conditions.

Another object is to provide a blow mold wherein a pair of blow mold parts are separable along a parting line which intersects a plurality of cavities positioned in different diametric planes.

Another object is to provide apparatus of the above type having novel details of construction and improved features of operation.

Various other objects and advantages will be apparent as the nature of the invention is more fully disclosed.

The nature of the invention will be better understood from the following description, taken in connection with the accompanying drawings in which a specific embodiment has been set forth for purposes of illustration.

In the drawings:

FIG. 1 is a partial longitudinal section of a molding apparatus, embodying the invention, showing the parts in parison forming position;

FIG. 2 is a similar section showing the parts in blowing position;

Figure 3:
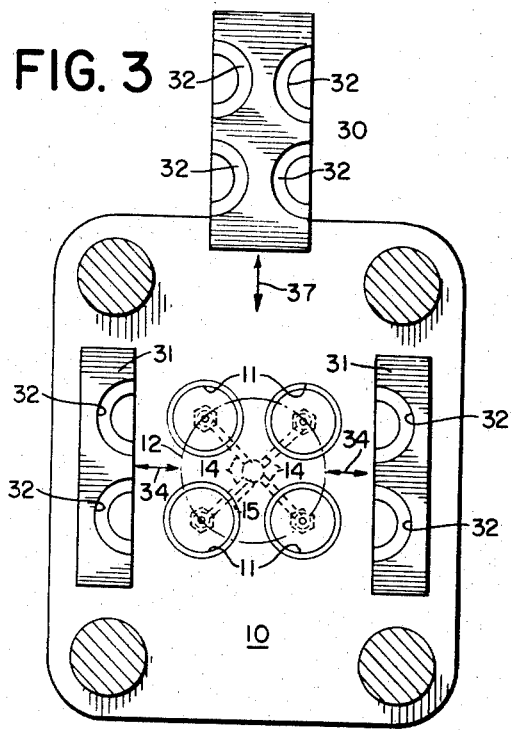
FIG. 3 is a transverse section taken on the line 3—3 of FIG. 1 showing the arrangement of the injection and separated mold cavities.

Referring to the drawings more in retail the invention is shown in FIGS. 1 to 4 as embodied in a parison molding and blowing apparatus comprising an injection or parison molding station including an outer die member 10 having four parison forming cavities 11, the centers of which are uniformly spaced around a circle indicated by dash line 12. Each cavity 11 communicates with an injection nozzle 13 located at its center and joined by radial passages 14 to a passage 15 located at the center of the circle 12 through which hot flowable organic plastic material is supplied to all of the cavities. The passages 14 are all of the same length so that the injection paths, from the center passage 15 to all of the cavities 11, are equal. This ensures that all of the parisons are injected with plastic material under the same conditions of temperature and pressure so as to provide uniformity in the products.

Each parison is injected onto a blow core 20 which is coaxial with the cavity 11 and is shaped to form the inner die member. The blow cores 20 are mounted on a common carrier 21 and are of standard construction, including air passages and control elements, not shown.

Figure 4:
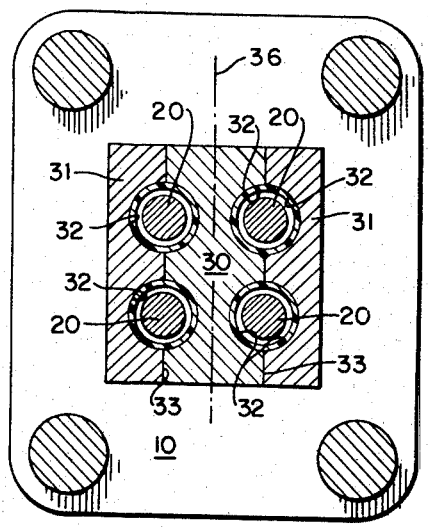
FIG. 4 is a transverse section taken on the line 4—4 of FIG. 2 showing the arrangement of the blow mold parts.

With the parts in the position shown in FIG. 1, a parison 25 is injected onto each of the blow cores 20 in the injection cavities 11. The blow cores 20, with the formed parisons thereon, are then retracted from the outer die member 10 into a blow station as illustrated in FIG. 2. In this station a blow mold composed of a center part 30 and a pair of outer parts 31 is closed about the parisons 25. The center part 30 and the outer parts 31 have blow cavities 32 formed therein in registration with each of the blow cores. The center part 30 and the outer parts 31 are joined along a parting line 33 which extends diametrically through all of the cavities 32 in a direction normal to the direction of movement of the outer parts 31. In the embodiment of FIG. 4, two cavities 32 are located on each side of the center line 36 of the center part 30, the parts 31 move in a direction normal to this center line 35, as indicated by the arrows 34, and the parting line 33 extends parallel to the center line 36 of the part 30.

After the parisons 25 have been blown in the cavities 32 to form hollow articles 35, the outer parts 31 are shifted transversely as indicated by the arrows 34 to release the articles 35 which remain in the part of the cavities 32 of the center part 30, suitable known means being provided to cause the blown articles 35 to be retained in the cavities of parts 30 and to be shifted therewith to a discharge station in the direction indicated by arrow 37. Alternately, articles 35 may be retained in parts 31 until discharged.

After blowing and prior to the opening of the blow mold, the blow cores 20 are retracted from the blow mold cavities and from the blown hollow articles so as to provide clearance for the movement of the blow mold parts. With the hollow articles formed and with the outer blow mold parts 31 separated along a path indicated by the arrows 34, the center part 30 is retracted from blow position out of the path of the carrier 21 and blow cores 20 in a direction normal to the direction of movement of the outer parts 31 as indicated by the arrow 37. The blow mold parts are thus shifted out of the path of the carrier 21 and blow cores 20 to the positions indicated in FIG. 1 and the blow cores are again advanced into the outer parison die member 10 for the injection of another set of parisons in a repeated cycle.

Figure 5:
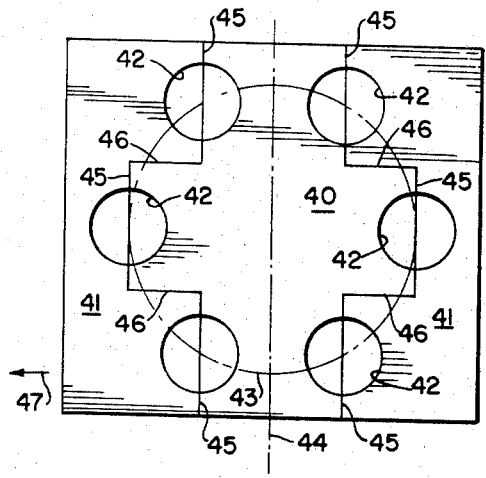
FIG. 5 is a section similar to FIG. 4 illustrating a six-cavity blow mold.

The embodiment of FIG. 5 illustrates a blow mold composed of a central part 40 and outer parts 41 having six blow cavities 42 with their centers uniformly spaced around a circle 43 indicated by a dash line and arranged three on each side of a center line 44. The parting line 45 extends parallel to the center line 44 and is offset along lines 46 between the center cavity and the upper and lower cavities. The arrangement is such that the parting line 45 extends diametrically through all of the cavities in a direction normal to the direction of the parting movement of the outer parts 41, which is indicated by the arrows 47.

Figure 6:
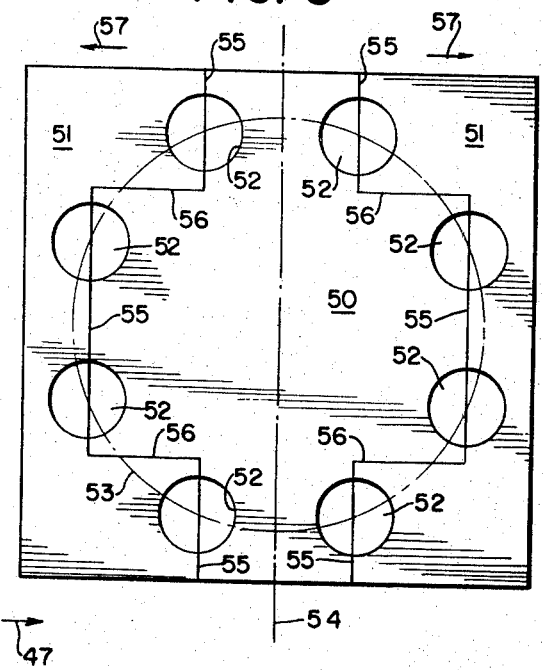
FIG. 6 is a section similar to FIG. 4 illustrating an eight-cavity blow mold embodying the invention.

FIG. 6 illustrates the invention applied to an eight-cavity mold. In this form the mold comprises a center part 50 and outer mold parts 51 with eight mold cavities 52 having their centers arranged along a circle 53, with four on each side of the center line 54. The parting line 55 in this case extends parallel to the center line 54 diametrically through each cavity and offset along lines 56 between the two upper and the two lower cavities. Here again the parting line through each cavity extends diametrically and normal to the direction of movement of the outer mold parts as indicated by arrows 57.

In all of these forms, the cavities are equidistant from the center of the circles passing through their centers so that the radial passages, from the center injection passage to the separate injection nozzles, are all of the same length. The parting lines are so arranged that the blown articles are extracted from the center parts of the blow mold when the outer parts are shifted in the manner shown in FIGS. 1 and 2. The arrangement of the parts is otherwise the same as shown in FIGS. 1 and 2.

While four, six and eight cavity molds have been shown, it is obvious that the molds may embody any desired number of cavities having a similar arrangement.

A three-part mold has been shown but the mold may be formed with additional parts, if convenient, depending upon the size and arrangement of the parts. It is to be understood that in each case the number and arrangement of the parison die cavities will be the same as that of the blow mold cavities and that a one piece parison die member or a multiple part parison die may be used depending upon the shape of the cavities and upon whether it is necessary to part the parison die to release each parison. If the parison die is to be parted, it may be formed in three or more parts and the cavities and parting lines arranged in the same way as shown for the blow molds above described. The various parts may be mounted and actuated by standard means. Only so much thereof has been shown as is necessary to an understanding of the present invention.

What is claimed is:

1. The method of making a plurality of blown hollow articles from a corresponding number of parisons which comprises injecting a hot flowable plastic material into a plurality of parison mold cavities and onto a carrier mounted blow core in each cavity, transferring the blow cores with the formed parisons thereon from said parison mold cavities along a predetermined first path into a blow station, enclosing said blow cores and said parisons in said blow station in a blow mold having a central part and a pair of opposed outer parts and having a plurality of blow cavities therein, blowing said parisons into said blow mold cavities to form said hollow articles, retracting said blow cores from said articles, retracting said outer blow mold parts from said central part along a predetermined second path normal to said first path to provide clearance for the carrier and blow cores for movement along said first path, shifting said central part with the blown articles therein to a discharge station along a predetermined third path normal to said first path to provide clearance for the carrier and blow cores for movement along said first path, and returning the blow cores along said first path to said parison mold cavities.

2. The method according to claim 1 wherein the blown articles remain in said central part and are shifted therewith to a discharge point.

3. Apparatus for making a plurality of blown hollow articles comprising a parison die having a plurality of cavities, an injection passage leading into the cavities, a blow core mounted on a carrier to be positioned in each of said cavities and forming an inner die member to receive said parison, means transferring said blow cores as a unit from said die cavities in a predetermined first path to a blow station spaced from said parison mold, a blow mold at said blow station comprising a center part and a pair of outer parts having a series of blow cavities arranged correspondingly to said parison die cavities, means for shifting said outer parts away from said center part along a predetermined second path normal to said first path, said blow mold having a parting line extending through said blow cavities in a direction normal to said second path, means for shifting said center part out of the path of the blow cores in a third path normal to said first path, so that said blow mold parts close around said blow cores and parisons when the latter have been shifted to blow position and retract along said second and third paths, respectively, to provide clearance for the carrier and blow cores for the return of said blow cores to said parison die after the blown articles have been removed from said blow cores.

4. Apparatus as set forth in claim 3 in which the center part is adapted to retain the blown articles when said outer parts are retracted and is shiftable along said third path to a discharge point.

5. Apparatus as set forth in claim 3 in which said blow mold contains at least four cavities arranged two on each side of a center line and said parting line is parallel to said center line.

6. Apparatus according to claim 3 in which said blow mold contains at least six cavities arranged symmetrically on opposite sides of a center line which is normal to the path of movement of said outer mold parts and said parting line is parallel to said center line and is offset between at least some of said cavities.

References Cited

UNITED STATES PATENTS

| 3,002,225 | 10/1961 | Goller. | |
| 3,170,971 | 2/1965 | Ninneman et al. | 264—97 |
| 3,172,929 | 3/1965 | Santelli | 264—97 |
| 2,914,805 | 12/1959 | Morin. | |
| 3,011,216 | 12/1961 | Gussoni | 264—97 |
| 3,339,231 | 12/1967 | Piotrowski. | |

ROBERT F. WHITE, *Primary Examiner.*

N. RUSHEFSKY, *Assistant Examiner.*

U.S. Cl. X.R.

264—297; 65—261; 18—5, 42